United States Patent
Mallek

(10) Patent No.: US 10,099,533 B2
(45) Date of Patent: Oct. 16, 2018

(54) VEHICLE TEMPERATURE CONTROL SYSTEM AND VEHICLE COMPRISING A VEHICLE TEMPERATURE CONTROL SYSTEM

(71) Applicant: EBERSPÄCHER CLIMATE CONTROL SYSTEMS GMBH & CO. KG, Esslingen (DE)

(72) Inventor: Andreas Johann Mallek, Renningen (DE)

(73) Assignee: EBERSPÄCHER SÜTRAK GMBH & CO. KG, Renningen (DE)

( * ) Notice: Subject to any disclaimer, the term of this patent is extended or adjusted under 35 U.S.C. 154(b) by 14 days.

(21) Appl. No.: 15/509,632

(22) PCT Filed: Sep. 10, 2015

(86) PCT No.: PCT/EP2015/070683
§ 371 (c)(1),
(2) Date: Mar. 8, 2017

(87) PCT Pub. No.: WO2016/038125
PCT Pub. Date: Mar. 17, 2016

(65) Prior Publication Data
US 2017/0259642 A1    Sep. 14, 2017

(30) Foreign Application Priority Data

Sep. 10, 2014  (DE) .................. 10 2014 218 111
Sep. 22, 2014  (DE) .................. 10 2014 219 042

(51) Int. Cl.
*B60H 1/00*  (2006.01)

(52) U.S. Cl.
CPC ...... *B60H 1/00371* (2013.01); *B60H 1/00849* (2013.01); *B60H 1/00899* (2013.01); *B60H 2001/00235* (2013.01)

(58) Field of Classification Search
CPC . F24F 13/10; B60H 1/00371; B60H 1/00899; B60H 2001/00235
See application file for complete search history.

(56) References Cited

U.S. PATENT DOCUMENTS 1,942,295 A      1/1934  Kerr, Jr. et al.
2004/0221597 A1* 11/2004 Hille et al. .......... B60H 1/32
                                                    62/244

FOREIGN PATENT DOCUMENTS

EP    0 963 895 A2   12/1999
WO    91/04164 A1     4/1991

* cited by examiner

*Primary Examiner* — Cassey D Bauer
(74) *Attorney, Agent, or Firm* — McGlew and Tuttle, P.C.

(57) ABSTRACT

A vehicle temperature-control system includes a refrigerant circuit (22). The refrigerant circuit includes a compressor (24), at least one condenser heat-exchanger assembly (28) around which air (L1) to be heated can flow, and at least one evaporator heat-exchanger assembly (40), around which air (L2) to be cooled can flow. For each of the two heat-exchanger assemblies (28, 40), there are two inflow regions (48, 50, 78, 80) and two outflow regions (62, 64, 84, 86), which can be switched by means of flap assemblies (44, 56, 88, 92). Both a heating operating mode and a cooling operating mode are selected with the flap assemblies. A heat pump operation in the vehicle, e.g., a bus, is enabled.

20 Claims, 5 Drawing Sheets

VEHICLE TEMPERATURE CONTROL SYSTEM AND VEHICLE COMPRISING A VEHICLE TEMPERATURE CONTROL SYSTEM

CROSS REFERENCE TO RELATED APPLICATIONS

This application is a United States National Phase Application of International Application PCT/EP2015/070683 filed Sep. 10, 2015 and claims the benefit of priority under 35 U.S.C. § 119 of German Application DE 10 2014 218 111.9 filed Sep. 10, 2014 and DE 10 2014 219 042.8 filed Sep. 22, 2014 the entire contents of which are incorporated herein by reference.

FIELD OF THE INVENTION

The invention pertains to a vehicle temperature control system, comprising a refrigerant circuit with a compressor, at least one condenser—heat exchanger assembly around which air to be heated can flow and at least one evaporator—heat exchanger assembly around which air to be cooled can flow. The present invention further pertains to a vehicle, especially a bus, which is configured with such a vehicle temperature control system.

BACKGROUND OF THE INVENTION

The interior to be thermally conditioned, most notably in vehicles used for passenger transport, e.g., buses, is relatively large, so that correspondingly dimensioned thermal conditioning units have to be used. In this case, it must be possible to cool the vehicle interior in the summer, while the vehicle interior has to be heated, for example, in the winter. The units intended for thermal conditioning shall be operable independently of the drive mode of such a vehicle, so that a necessary conditioning corresponding to the external thermal conditions can be carried out even in case of longer parking phases.

For cooling vehicle interiors, air conditioning systems operating with a refrigerant circuit are used, the condenser or condenser heat exchanger assembly of which discharges heat from the compressed refrigerant towards the environment, while in the evaporator or the evaporator—heat exchanger assembly, heat is drawn from the air flowing around said assembly in the evaporation process of the refrigerant, so that this air can be introduced, in a cooled state, into a vehicle interior. If such an air conditioning system with a refrigerant circuit shall be operated during the heating operation as well, then it is generally necessary to reverse the refrigerant circuit. This requires a complicated line routing with numerous valves. An alternative possibility for operating such an air conditioning system both during the cooling operation and during the heating operation is the provision of an intermediate heat transfer circuit. In this case as well, a complicated line routing with additional pumps and valves is necessary.

SUMMARY OF THE INVENTION

An object of the present invention is to provide a temperature control system, which can be used in a simple manner both for a cooling operation and for a heating operation and can be switched between these operating modes.

This object is accomplished according to the present invention by a vehicle temperature control system, comprising:
a refrigerant circuit with a compressor, at least one condenser heat exchanger assembly around which air to be heated can flow and at least one evaporator—heat exchanger assembly around which air to be cooled can flow,
for the at least one condenser heat exchanger assembly:
a) a first inflow area which can be released and can be blocked by a first flap assembly and a second inflow area which can be released and can be blocked by the first flap assembly,
b) a first outflow area which can be released and can be blocked by a second flap assembly and a second outflow area which can be released and can be blocked by the second flap assembly,
for the at least one evaporator—heat exchanger assembly:
c) a third inflow area which can be released and can be blocked by a third flap assembly and a fourth inflow area which can be released and can be blocked by the third flap assembly,
d) a third outflow area which can be released and can be blocked by a fourth flap assembly and a fourth outflow area which can be released and can be blocked by the fourth flap assembly, wherein the second outflow area and the fourth outflow area lead to an inner outflow area or/and the first outflow area and the third outflow area lead to an outer outflow area.

In the temperature control system according to the present invention, by providing the various flap assemblies, the possibility is created to route the air to be thermally conditioned such that it can be selectively brought into thermal interaction either with the condenser heat exchanger assembly or with the evaporator—heat exchanger assembly. This means that in the configuration according to the present invention, a flow direction for the air to be thermally conditioned to be set corresponding to the necessary thermal conditioning is predetermined, while the refrigerant circuit per se always operates in the same manner independently of the operating mode. This leads to a simple configuration and makes possible a spontaneous switching over between the cooling operation and a heating operation, because only a different air flow routing is necessary for this, but no action on the thermally relatively slow refrigerant coolant.

Provisions may be made in an especially advantageous embodiment for a first delivery device for delivering air from the inner outflow area, preferably to a vehicle interior, to be associated with the inner outflow area. Either cooled air or heated air is fed to the inner outflow area depending on the setting of the various flap assemblies, so that this air can then possibly be forwarded into the vehicle interior. As an alternative or in addition, provisions may be made for a second delivery device for delivering air from the outer outflow area, preferably to an external environment, to be associated with the outer outflow area. The air, which is used as the heat source during the heating operation and is used during the cooling operation for the uptake of heat from the air to be cooled or from the refrigerant flowing in the refrigerant circuit, can flow out via this outer outflow area.

The first delivery device may comprise at least one radial blower, preferably a double radial blower. The second delivery device may comprise at least one axial blower.

Provisions may further be made in the temperature control system according to the present invention for the first inflow area and the third inflow area to be intended for receiving air from an external environment and for the second inflow area and the fourth inflow area to be intended for receiving air from a vehicle interior. Thus, two inflow areas are each associated with both the condenser heat exchanger assembly and the evaporator—heat exchanger assembly, so that, for example, air drawn from a vehicle interior or air introduced from the external environment can flow around each of these inflow areas.

A compact design of the temperature control system according to the present invention can be achieved, for example, by at least one condenser heat exchanger assembly and at least one evaporator—heat exchanger assembly being arranged located opposite one another in relation to the inner outflow area or/and outer outflow area associated with same.

In order to be able to set up the various air flows with the vehicle temperature control system according to the present invention for the cooling operation or the heating operation in a simple manner, it is suggested that the first flap assembly, the second flap assembly, the third flap assembly and the fourth flap assembly be settable in a cooling operation setting state, wherein in the cooling operation setting state:
  the first flap assembly releases the first inflow area and blocks the second inflow area,
  the second flap assembly releases the first outflow area and blocks the second outflow area,
  the third flap assembly blocks the third inflow area and releases the fourth inflow area,
  the fourth flap assembly blocks the third outflow area and releases the fourth outflow area,
or/and be settable in a heating operation setting state, wherein in the heating operation setting state:
  the first flap assembly blocks the first inflow area and releases the second inflow area,
  the second flap assembly blocks the first outflow area and releases the second outflow area,
  the third flap assembly releases the third inflow area and blocks the fourth inflow area,
  the fourth flap assembly releases the third outflow area and blocks the fourth outflow area.

In an embodiment variant which is structurally especially simple to achieve, provisions may be made for at least one flap assembly, and preferably the first flap assembly or/and the third flap assembly, to be configured as a single flap assembly, wherein in a first setting state of the single flap assembly the flap of the single flap assembly releases an inflow area or outflow area associated with the single flap assembly and blocks another inflow area or outflow area associated with the single flap assembly and wherein in a second setting state of the single flap assembly the flap of the single flap assembly blocks the one inflow area or outflow area and releases the other inflow area or outflow area. As an alternative or in addition, provisions may be made for at least one flap assembly, preferably the second flap assembly or/and the fourth flap assembly, to be configured as a double flap assembly, wherein in a first setting state of the double flap assembly a first flap of the double flap assembly releases an inflow area or outflow area associated with the double flap assembly and a second flap of the double flap assembly blocks another inflow area or outflow area associated with the double flap assembly and wherein in a second setting state of the double flap assembly the first flap of the double flap assembly blocks the one inflow area or outflow area and the second flap of the double flap assembly releases the other inflow area or outflow area. In order to be able to provide a greatest possible variability in the air flow routing, it is further suggested that an independent flap drive be associated with each flap assembly, preferably with each flap of each flap assembly.

Provisions may be made especially in the case of using the vehicle temperature control system according to the present invention in vehicles used for passenger transport, e.g., buses, for the refrigerant circuit to comprise at least two condenser heat exchanger assemblies and at least two evaporator—heat exchanger assemblies to provide an increased efficiency, an inner outflow area or/and an outer outflow area each being associated with each condenser heat exchanger assembly and evaporator—heat exchanger assembly pair.

In such a configuration with a plurality of condenser heat exchanger assemblies and evaporator—heat exchanger assemblies, provisions may further be made for at least two condenser heat exchanger assemblies to be connected parallel to one another, or/and for at least two evaporator—heat exchanger assemblies to be connected parallel to one another, or/and for these assemblies to be arranged located opposite one another in relation to the inner outflow areas or/and outer outflow areas in each condenser heat exchanger assembly and evaporator—heat exchanger assembly pair and the condenser heat exchanger assembly of one pair to be arranged next to the evaporator—heat exchanger assembly of the other pair.

The present invention further pertains to a vehicle, and especially a bus, comprising a vehicle interior and a vehicle temperature control system configured according to the present invention for feeding thermally conditioned air into the vehicle interior.

In order to able to provide a flow routing supporting or allowing the thermal conditioning here, it is suggested that the first inflow area and the third inflow area be arranged for receiving air from an external environment, and that the second inflow area and the fourth inflow area be arranged for receiving air from the vehicle interior.

For introducing the thermally conditioned air into the vehicle interior, it is suggested that at least one air distribution duct fed with air via at least one inner outflow area be provided. In order to be able to generate various climate zones in various areas of the vehicle interior here, it is further suggested that a first air distribution duct be fed with air via a first inner outflow area and a second air distribution duct be fed with air via a second inner outflow area, wherein the first air distribution duct is separated or can be separated from the second air distribution duct.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
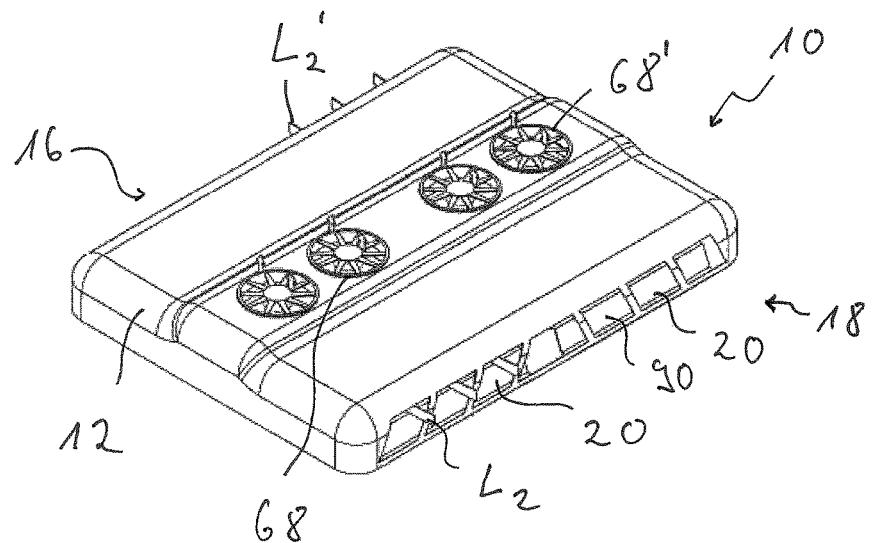
FIG. 1 is a perspective view of a vehicle temperature control system.
Figure 2:
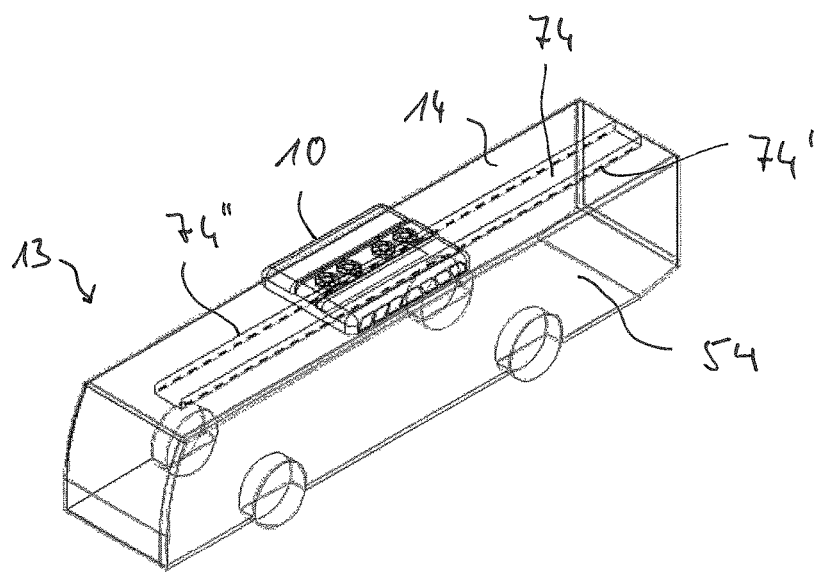
FIG. 2 is a simplified view of a bus with a vehicle temperature control system according to FIG. 1 provided on the roof of same.

Referring to the drawings, a vehicle temperature control system is generally designated by 10 in FIGS. 1 and 2. The vehicle temperature control system 10 may especially advantageously be used in connection with a bus 13 or other vehicles to be used for passenger transport, because it is capable of thermally conditioning relatively large quantities of air and thus cool or heat relatively large vehicle interiors as desired.

The vehicle temperature control system 10 comprises a housing 12, with which this system 10 can be mounted on the roof 14 of the bus 13. In respective lateral areas 16, 18, side in relation to a respective lateral positioning on a vehicle, the housing 12 has a large number of openings 20, via which air can enter the housing 12 from an external environment. This will be described in detail below.

Figure 3:
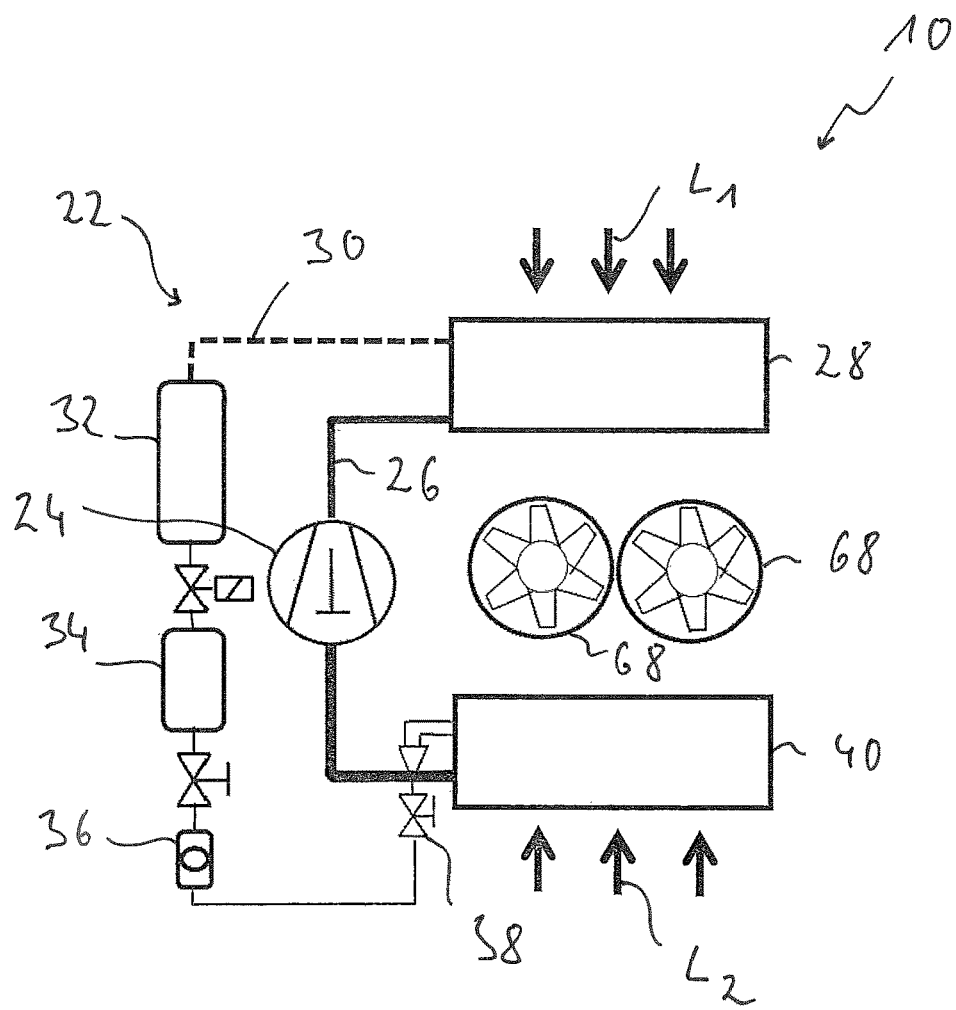
FIG. 3 is a schematic configuration of the vehicle temperature control system.

FIG. 3 shows an example of a refrigerant circuit of the vehicle temperature control system 10, which refrigerant circuit is generally designated by 22, in a schematic view. The refrigerant circuit 22 comprises a compressor 24, which delivers compressed refrigerant via a line area 26 towards a condenser or a condenser heat exchanger assembly 28. Heat being released during the condensation process is taken up at the condenser heat exchanger assembly 28 from a first air flow $L_1$ flowing around this condenser heat exchanger assembly 28, so that the first air flow $L_1$ is heated after flowing around the condenser heat exchanger assembly 28.

The compressed or liquefied refrigerant 30 flows via a line area 30 to a collection tank 32 and to a drier 34 and to an inspection glass 36 and then reaches an expansion valve 38. Via the expansion valve 38, the refrigerant enters into an evaporator or an evaporator heat exchanger assembly 40. A second air flow $L_2$ flows around the evaporator heat exchanger assembly 40 and discharges heat to the evaporator heat exchanger assembly 40 during the evaporation process of the refrigerant, so that the second air flow $L_2$ is cooled after flowing around the evaporator heat exchanger assembly 40. The refrigerant leaving the evaporator heat exchanger assembly 40 in a gaseous aggregate state returns to the compressor 24 via only one line area 42. As will be described below, it can be ensured that a vehicle interior or the air contained therein is either cooled or heated by selectively routing the air flows $L_1$ and $L_2$ to the condenser heat exchanger assembly 28 or to the evaporator heat exchanger assembly 40.

Figure 4:
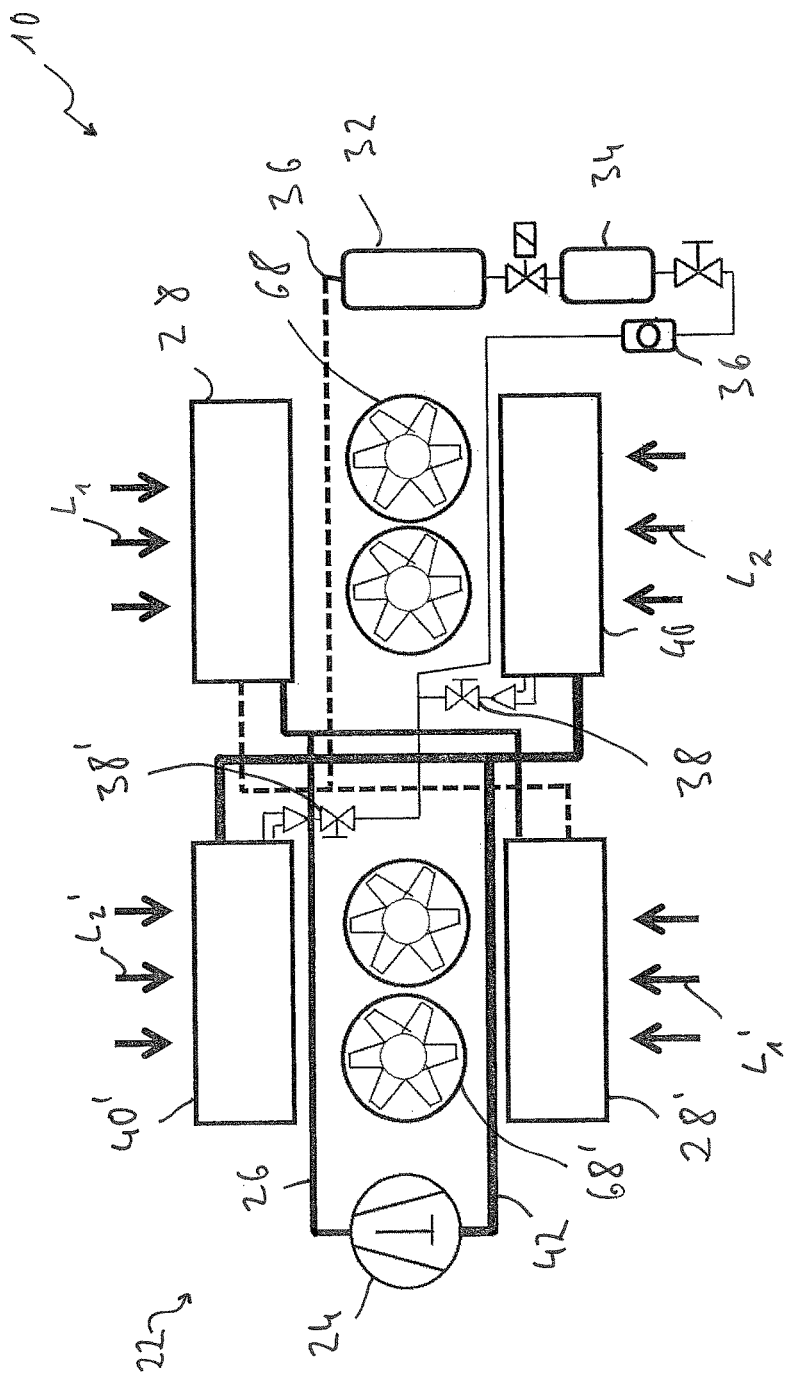
FIG. 4 is a view corresponding to FIG. 3 of an alternative embodiment of the vehicle temperature control system.

An alternative embodiment of the refrigerant circuit 22 is shown in FIG. 4. The configuration corresponds, in principle, to the configuration of the refrigerant circuit 22 described above in reference to FIG. 3. In contrast to this configuration, however, two condenser heat exchanger assemblies 28, 28' and correspondingly also two evaporator heat exchanger assemblies 40, 40' are provided in the embodiment variant shown in FIG. 4. The two condenser heat exchanger assemblies 28, 28', just as the two evaporator heat exchanger assemblies 40, 40', are connected parallel to one another, which is achieved by means of corresponding branching of the line area 26 away from the compressor 24 or the line area 42 back to the compressor 24. The condenser heat exchanger assembly 28 and the evaporator heat exchanger assembly 40 are associated with one another in pairs and are arranged located opposite one another, as are the condenser heat exchanger assembly 28' and the evaporator heat exchanger assembly 40'. These two pairs each with a condenser heat exchanger assembly 28 or 28' and an evaporator heat exchanger assembly 40 or 40' operate independently of one another for conditioning respective air flows $L_1$, $L_2$ or $L_{1'}$, $L_{2'}$, so that, as will be described below, the generation of different climate zones in a vehicle interior is, in principle, possible.

Figure 5:
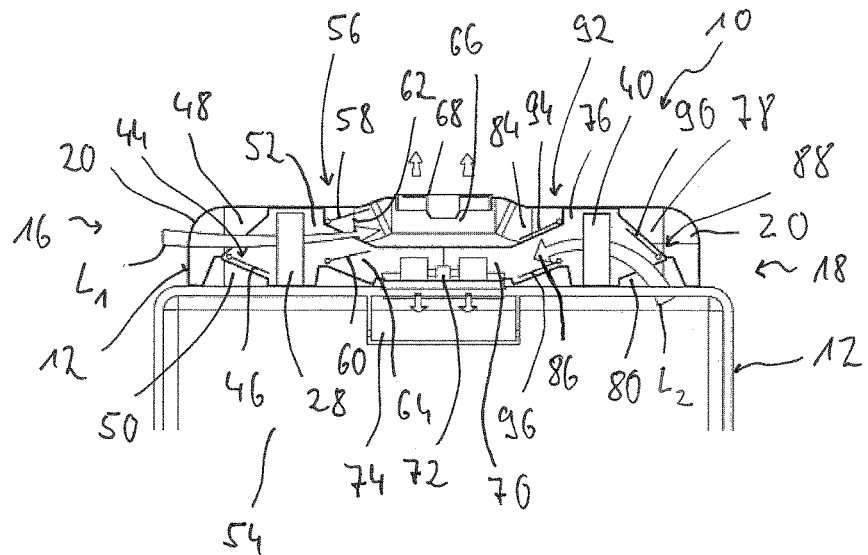
FIG. 5 is a general sectional view of the vehicle temperature control system in a cooling operation.
Figure 6:
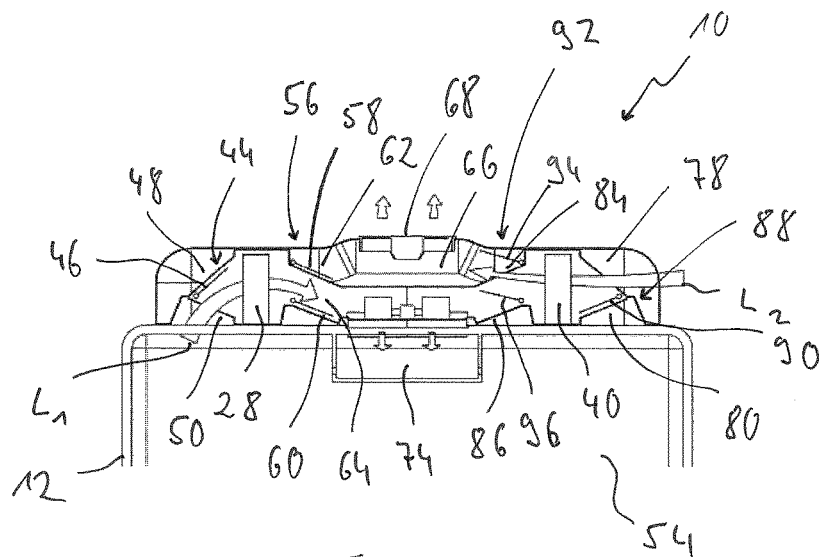
FIG. 6 is a view corresponding to FIG. 5 in the heating operation of the vehicle temperature control system.

The mode of operation and the air flow routing for a condenser heat exchanger assembly and evaporator heat exchanger assembly pair for a cooling operation, on the one hand, and for a heating operation, on the other hand, are shown in FIGS. 5 and 6, respectively. For example, reference is made here to the pair comprising the condenser heat exchanger assembly 28 and the evaporator heat exchanger assembly 40 also shown in FIG. 3. It should be pointed out once again that the other pair can also be operated in a corresponding manner. It should also be emphasized in this regard that in the case of the heat exchanger assemblies located opposite one another in pairs, as FIG. 4 illustrates this, the evaporator heat exchanger assembly 40' lies next to the condenser heat exchanger assembly 28 of the other pair, while the evaporator heat exchanger assembly 40 lies next to the condenser heat exchanger assembly 28'. In particular, the association in this case is such that the heat exchanger assemblies 40', 28 lie on one side, for example, the side 16 of the housing 12 or on the side of the temperature control system 10, while the other two heat exchanger assemblies 28', 40 lie on the other side, for example, the side 18. This leads to a very uniform conditioning of a vehicle interior.

FIG. 5 shows the configuration of the temperature control system 10 provided in the housing 12 with the condenser heat exchanger assembly 28 and the evaporator heat exchanger assembly 40. A first flap assembly 44 is associated with the condenser heat exchanger assembly 28. The first flap assembly 44 is configured as a single flap assembly and comprises a flap 46, by means of which a first inflow area 48 as well as a second inflow area 50 to an interior area 52 can be selectively blocked or released, in which interior area 52 the condenser heat exchanger assembly 28 is provided. In this case, the arrangement is such that the first inflow area 48 is open towards the external environment or is in connection with the external environment via one of the openings 20 in the housing 12, while the second inflow area 50 is open to a vehicle interior 54 or is in connection therewith.

A second flap assembly 56, which is configured as a double flap assembly with two flaps 58, 60, is further associated with the condenser heat exchanger assembly 28. A first outflow area 62 can be selectively released or blocked by the first flap 58 of the second flap assembly 56. A second outflow area 64 can be selectively released or blocked by the second flap 60 of the second flap assembly 56. In this case, the first outflow area leads to an outer outflow area 66, from which air, for example, delivered by one or more axial blowers 68, preferably two such axial blowers 68, flowing into the outer outflow area 66 can be discharged to the external environment. The second outflow area 64 leads to an inner outflow area 70. Delivered, for example, by one or more double radial blowers 72, and preferably, for example, three such double radial blowers 72, the air is routed from the inner outflow area 70 into an air distribution duct 74, which shall be explained below, and into the vehicle interior 54 via this duct.

A second interior area 76, in which the evaporator heat exchanger assembly 40 is arranged, is provided on the side located opposite the first interior area 52 in relation to the outer outflow area 66 as well as the inner outflow area 70. A third inflow area 78 and a fourth inflow area 80 lead to the second interior area 76. A third outflow area 82 and a fourth outflow area 86 lead away from the second interior area 76 to the outer outflow area 66 or to the inner outflow area 70. A third flap assembly 88, which is configured as a single flap assembly with a flap 90, is provided to selectively release or block the third inflow area 78 or the fourth inflow area 80. In this case, the third inflow area 78 is in connection with the external environment, for example, via one of the openings 20 in the housing 12, while the fourth inflow area 80 is in connection with the vehicle interior 54. A fourth flap assembly 92, which is configured as a double flap assembly with two flaps 94, 96, can selectively release or block the third outflow area 84 with its flap 94 from the second interior area 76 to the outer outflow area 66 and can selectively release or block the fourth outflow area 86 with its second flap 96 from the second interior area 76 to the inner outflow area 70.

It should be pointed out here that separate drives constructed, for example, with electric motors, can each be associated with the various flaps of the flap assemblies 44, 56, 88, 92 in order to be able to independently adjust each of this flaps regardless of the position or actuation of the other flaps. If advantageous or necessary, the flaps of respective double flap assemblies, which are associated with one another in pairs, may, however, for example, be actuated together or be adjusted by a common drive as well.

In FIG. 5, the vehicle temperature control system 10 is in a cooling operation state, in which air can be introduced in a cooled state into the vehicle interior 54 through the evaporator heat exchanger assembly 40. In order to achieve this, the flap 46 of the first flap assembly 44 is also set such that it releases the first inflow area 48 and essentially blocks the second inflow area 50. Therefore, the air flow $L_1$ flowing from the external environment area is brought into the first interior area 52 and thus in thermal interaction with the condenser heat exchanger assembly 28. The second flap assembly 56 is set so that its first flap 60 essentially blocks the second outflow area 64. As a result, the air flow $L_1$ reaches the outer outflow area 66 after flowing around the condenser heat exchanger assembly 28 and there, drawn under the delivery action of the axial blowers 68 and heated, flows again into the external environment.

The flap 90 of the third flap assembly 88 is set such that it releases the fourth inflow area 80 and essentially blocks the third inflow area 78, so that the air flow $L_2$ routed to the evaporator heat exchanger assembly 40 flows from the vehicle interior 54. The first flap 94 of the fourth flap assembly 92 is set such that it essentially releases the fourth outflow area 86. As a result, after the air flow $L_2$ has been brought into thermal interaction with the evaporator heat exchanger assembly 40 and heat has been discharged there, i.e., has been cooled, this air flow $L_2$ reaches the inner outflow area 70 and is delivered by the double radial blower 72 into the air distribution duct 74 and into the vehicle interior 54 via this duct.

In the cooling operation setting state of the various flap assemblies 44, 56, 88, 92 shown in FIG. 5, the refrigerant circuit 22 of the vehicle temperature control system thus operates as an air conditioning system, by means of which the air flow $L_2$ drawn from the vehicle interior 54 discharges heat to the refrigerant circuit 22 and is thus fed back in a cooled state again into the vehicle interior 54, while the air flow $L_1$ received from the external environment receives heat from the refrigerant circuit 22 and is correspondingly again discharged in a heated state to the external environment.

FIG. 6 shows a heating operation state of the vehicle temperature control system 10 or a heating operation setting state of the various flap assemblies 44, 56, 88, 92. In this connection, the flap 46 of the first flap assembly 44 is set such that it essentially blocks the first inflow area 48 and releases the second inflow area 50, so that the air flow $L_1$ routed to the condenser heat exchanger assembly 28 is discharged from the vehicle interior 54. The first flap 58 of the second flap assembly 56 essentially blocks the first outflow area 62, while the second flap 60 of the second flap assembly 56 releases the second outflow area 64. After thermal interaction with the condenser heat exchanger assembly 28, i.e., heating of the air flow $L_1$, this air flow $L_1$ reaches the inner outflow area 70 and back into the vehicle interior 54 via the air distribution duct 74.

The flap 90 of the third flap assembly 88 is set such that it essentially blocks the fourth inflow area 80, while the third inflow area 78 is released, so that air $L_2$ received from the external environment reaches the evaporator heat exchanger assembly 40 under the delivery action of the axial blowers 68. The first flap 94 of the fourth flap assembly 92 is set such that it releases the third outflow area 84, while the second flap 96 of the fourth flap assembly 92 is set such that it essentially blocks the fourth outflow area 86. The air flow $L_2$ received from the external environment and cooled by thermal interaction with the evaporator heat exchanger assembly thus reaches the outer outflow area 66 and back again to the external environment under the delivery action of the axial blowers 68. Thus, in the heating operation state shown in FIG. 6, the heat drawn from the air flow $L_2$ at the evaporator heat exchanger assembly 40 is transferred to the air flow $L_1$ in the area of the condenser heat exchanger assembly 28. This means that in this heating operation state of the vehicle temperature control system 10, it is operated like a heat pump.

If, as FIG. 4 shows this, the refrigerant circuit is configured with two or more condenser heat exchanger assembly and evaporator heat exchanger assembly pairs each, then each such pair can be operated either in the heating operation state or in the cooling operation state by the flap assemblies associated with same independently or the other pair or other pairs. For this purpose, it is advantageous or necessary to separate the inner outflow areas and outer outflow areas associated with the respective pairs from the inner outflow areas and outer outflow areas associated with the respective other pairs. It is likewise necessary and advantageous to ensure that the flap assemblies associated with each respective pair or the flaps thereof can be adjusted independently as well. Thus, for example, it can be ensured that in the exemplary embodiment of the refrigerant circuit 22, one of the condenser heat exchanger assembly and evaporator heat exchanger assembly pairs shown in FIG. 4 is operated in the heating operation state, while the other pair is operated in the cooling operation state by a respective other position of the flap assembly. This does not require any action on the refrigerant circuit or the refrigerant circulation itself, because, regardless of whether the operation is in a cooling operation state or in a heating operation state, the functionalities of the evaporator heat exchanger assemblies, on the one hand, and of the condenser heat exchanger assemblies, on the other hand, are retained.

FIG. 2 shows the association of the vehicle temperature control system 10 shown in FIG. 1 with a bus 13, wherein the vehicle temperature control system 10 is configured here, for example, with the refrigerant circuit 22 shown in FIG. 4 with two condenser heat exchanger assembly and evaporator heat exchanger assembly pairs. The vehicle temperature control system 10 is positioned approximately centrally on the bus 13 or the roof 14 thereof and thus also centrally in relation to the air distribution duct 74 and centrally in relation to a longitudinal extension direction in the vehicle longitudinal direction. If the air distribution duct 74 is configured as a continuous duct, the two condenser heat exchanger assembly and evaporator heat exchanger assembly pairs are then advantageously operated by a corresponding setting of the associated flap assemblies in the same operating mode, i.e., either heating operation or cooling operation. In principle, the air distribution duct 74 could, however, be divided into a first air distribution duct 74', which leads from the vehicle temperature control system 10 to the rear area of the vehicle interior 54, and a second air distribution duct 74'', which leads from the vehicle temperature control system 10 to the front area of the vehicle interior 54. In this connection, for example, provisions could further be made for the condenser heat exchanger assembly 28 and the evaporator heat exchanger assembly 40 to cooperate with the first air distribution duct 74', while the condenser heat exchanger assembly 28' and the evaporator heat exchanger assembly 40' cooperate with the second air distribution duct 74''. For example, these two air distribution ducts 74' and 74'' may, in principle, be separated from one another or be separated from one another by a correspondingly actuatable flap assembly. Due to the operability of the two pairs of heat exchanger assemblies independent of one another in the heating operation or in the cooling operation, it is thus possible, for example, to cool the rear area of the vehicle interior 54, while the front area is heated, or vice versa. If both pairs of heat exchanger assemblies are operated in the same operating mode, the entire interior 54 can be either cooled or heated.

Figure 7:
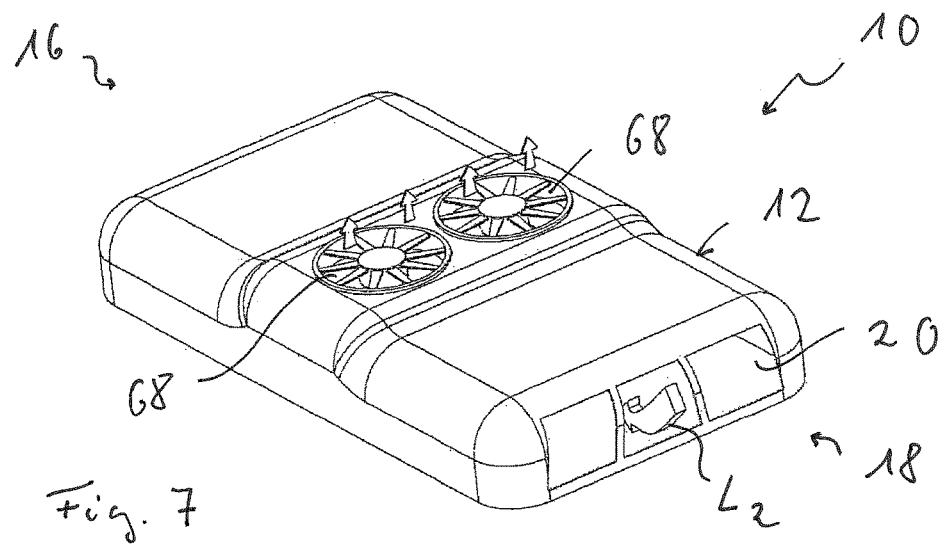
FIG. 7 is a view corresponding to FIG. 1 of a vehicle temperature control system having an alternative configuration.
Figure 8:
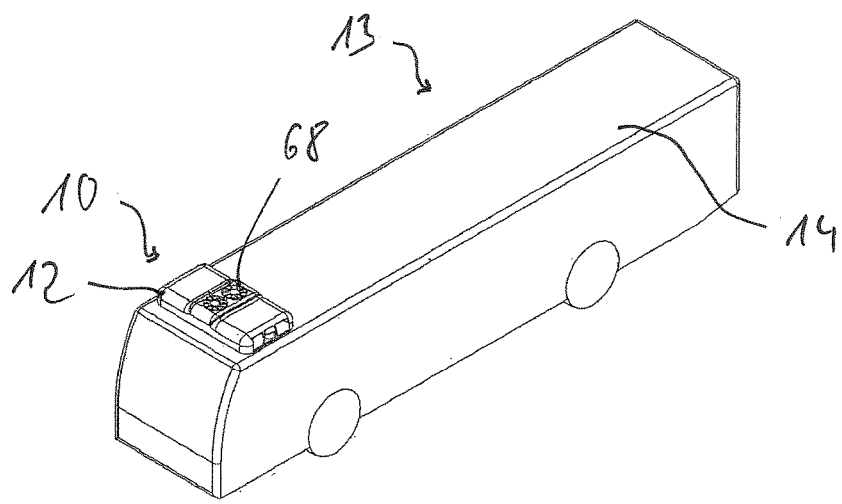
FIG. 8 is a simplified view of a bus with a vehicle temperature control system according to FIG. 7 provided on the roof of same.

FIGS. 7 and 8 show a vehicle temperature control system 10 with an alternative configuration or a bus 13 equipped therewith. The vehicle temperature control system 10 of FIGS. 7 and 8 is configured such that it has a refrigerant circuit 22 according to FIG. 3, i.e., a condenser heat exchanger assembly 28 and an evaporator heat exchanger assembly 40. As was described above, outer and inner outflow areas, via which heat-treated air can either be discharged to the outside or can be introduced into the vehicle interior, are then associated with this pair of heat exchanger assemblies. It is seen that the vehicle temperature control system 10 has a more compact design because of the provision of only one pair of heat exchanger assemblies. This configuration can be selected depending on the volume of the vehicle interior to be temperature controlled.

It is further seen in FIG. 8 that the vehicle temperature control system 10 is arranged, for example, in the front area of the bus 13 or of the roof 14 thereof and the air discharged via the inner outflow area is distributed into the vehicle interior via an distribution duct, which cannot be seen in FIG. 8. Of course, this vehicle temperature control system 10 could, just as the vehicle temperature control system 10 also shown in FIG. 2, be arranged at another position on the bus 13 as well, for example, in the rear area of the roof 14. It should also be pointed out that a number of blowers adapted corresponding to the air quantity to be delivered may also be provided in association with the corresponding pairs of heat exchanger assemblies. Only one axial blower or a radial blower or a double radial blower could, for example, also be provided especially in case of a lower air quantity to be delivered.

It is possible with the above-described configuration of a vehicle temperature control system to thermally condition, i.e., to cool or heat, a vehicle interior of a vehicle in the desired manner in a simple manner and also in a quickly switchable manner during the operation. An action on the refrigerant circuit or the refrigerant flow direction itself is not necessary because the setting of a defined operating mode is carried out alone by the air flow routing to or from the various heat exchanger assemblies. Of course, it is thereby also possible to operate the vehicle temperature control system in other operating modes, for example, a defrost mode. In this connection, the evaporator heat exchanger assemblies are cut off from the external environment by means of corresponding actuation of the flap assemblies and the condensation developing at the evaporator heat exchanger assembly is collected in a drip tray. In principle, a defrost process may also be carried out using a hot gas system or an electrical heating system. The heat coils needed for heating the evaporator may as well be provided, for example, in the piping of the evaporator heat exchanger assembly.

Further, the temperature control system according to the present invention may also be operated such that the air drawn from the vehicle interior and fed back into same is mixed with fresh air both during the heating operation and during the cooling operation. This may particularly be carried out by corresponding actuation of the first flap assembly or the third flap assembly, so that, for example, the first inflow area or the third inflow area is not completely blocked in the respective operating state. With simultaneous delivery of air from the vehicle interior to the external environment, the introduction of fresh air into the vehicle interior is also possible, coupled with the possibility of cooling or heating the air to be routed into the vehicle interior.

Finally, it should be pointed out that the embodiment variant described above and shown in the figures, in which an outer outflow area as well as an inner outflow area each is provided in association with an evaporator heat exchanger assembly and condenser heat exchanger assembly pair, is especially advantageous because the blowers delivering into the interior or to the external environment can then each be used both for the air flowing around the evaporator heat exchanger assembly and for the air flowing around the condenser heat exchanger assembly. Of course, it is also possible to provide an independent outer outflow area or/and an independent inner outflow area each, preferably with blowers associated with each of these, in association with the evaporator heat exchanger assembly, on the one hand, and in association with the condenser heat exchanger assembly, on the other hand.

While specific embodiments of the invention have been shown and described in detail to illustrate the application of the principles of the invention, it will be understood that the invention may be embodied otherwise without departing from such principles.

The invention claimed is:
1. A vehicle temperature control system comprising:
a refrigerant circuit with a compressor, at least one condenser heat exchanger assembly around which air to be heated can flow and at least one evaporator heat exchanger assembly around which air to be cooled can flow, wherein:

the at least one condenser heat exchanger assembly comprises:
- a first inflow area, a first flap assembly, the first inflow area being released and blocked by the first flap assembly, and a second inflow area, the second inflow area being released and blocked by the first flap assembly; and
- a first outflow area, a second flap assembly, the first outflow area being released and blocked by the second flap assembly, and a second outflow area, the second outflow area being released and blocked by the second flap assembly;

the at least one evaporator heat exchanger assembly comprises:
- a third inflow area, a third flap assembly, the third inflow area being released and blocked by the third flap assembly, and a fourth inflow area, the fourth inflow area being released and blocked by the third flap assembly;
- a third outflow area, a fourth flap assembly, the third outflow area being released and blocked by the fourth flap assembly, and a fourth outflow area, the fourth outflow area being released and blocked by the fourth flap assembly; and
- the second outflow area and the fourth outflow area lead to an inner outflow area or the first outflow area and the third outflow area lead to an outer outflow area or both the second outflow area and the fourth outflow area lead to an inner outflow area and the first outflow area and the third outflow area lead to an outer outflow area.

2. A vehicle temperature control system in accordance with claim 1, wherein:
a first delivery device is associated with the inner outflow area for delivering air from the inner inflow area to a vehicle interior; or
a second delivery device is associated with the outer outflow area for delivering air from the outer outflow area to an external environment; or
a first delivery device is associated with the inner outflow area for delivering air from the inner inflow area to a vehicle interior and a second delivery device is associated with the outer outflow area for delivering air from the outer outflow area to an external environment.

3. A vehicle temperature control system in accordance with claim 2, wherein:
the first delivery device comprises at least one radial blower or
the second delivery device comprises at least one axial blower; or
the first delivery device comprises at least one radial blower and the second delivery device comprises at least one axial blower.

4. A vehicle temperature control system in accordance with claim 1, wherein: the first inflow area and the third inflow area receive air from an external environment, and the second inflow area and the fourth inflow area receive air from a vehicle interior.

5. A vehicle temperature control system in accordance with claim 1, wherein: the at least one condenser heat exchanger assembly and the at least one evaporator heat exchanger assembly are arranged located opposite each other in relation to the inner outflow area or the outer outflow area associated with same or in relation to the inner outflow area and the outer outflow area associated with same.

6. A vehicle temperature control system in accordance with claim 1, wherein: the first flap assembly, the second flap assembly, the third flap assembly and the fourth flap assembly can be set in a cooling operation setting state, wherein in the cooling operation setting state:
the first flap assembly releases the first inflow area and blocks the second inflow area;
the second flap assembly releases the first outflow area and blocks the second outflow area;
the third flap assembly blocks the third inflow area and releases the fourth inflow area; and
the fourth flap assembly blocks the third outflow area and releases the fourth outflow area;
and can be set in a heating operation setting state, wherein in the heating operation setting state:
the first flap assembly blocks the first inflow area and releases the second inflow area,
the second flap assembly blocks the first outflow area and releases the second outflow area,
the third flap assembly releases the third inflow area and blocks the fourth inflow area, and
the fourth flap assembly releases the third outflow area and blocks the fourth outflow area.

7. A vehicle temperature control system in accordance with claim 1, wherein at least one of the flap assemblies, is configured as a single flap assembly with a flap, wherein in a first setting state of the single flap assembly the flap of the single flap assembly releases an inflow area or outflow area associated with the single flap assembly and blocks another inflow area or outflow area associated with the single flap assembly and wherein in a second setting state of the single flap assembly the flap of the single flap assembly blocks the one inflow area or outflow area and releases the other inflow area or outflow area.

8. A vehicle temperature control system in accordance with claim 1, wherein an independent flap drive is associated with each flap assembly.

9. A vehicle temperature control system in accordance with claim 1, wherein that the refrigerant circuit comprises at least two condenser heat exchanger assemblies and at least two evaporator heat exchanger assemblies, wherein an inner outflow area and an outer outflow area is associated with each condenser heat exchanger assembly and evaporator heat exchanger assembly pair.

10. A vehicle temperature control system in accordance with claim 9, wherein:
at least two condenser heat exchanger assemblies are connected parallel to one another, or
at least two evaporator—heat exchanger assemblies are connected parallel to one another, or
in regard to the inner outflow areas or/and outer outflow areas in each condenser heat exchanger assembly and evaporator heat exchanger assembly pair, these are arranged located opposite one another, and the condenser heat exchanger assembly of one pair is arranged next to the evaporator—heat exchanger assembly of the other pair, or
any combination of at least two condenser heat exchanger assemblies are connected parallel to one another, and at least two evaporator heat exchanger assemblies are connected parallel to one another, and in regard to the inner outflow areas or/and outer outflow areas in each condenser heat exchanger assembly and evaporator heat exchanger assembly pair, these are arranged located opposite one another, and the condenser heat exchanger assembly of one pair is arranged next to the evaporator heat exchanger assembly of the other pair.

11. A vehicle comprising a vehicle interior and a vehicle temperature control system for feeding thermally conditioned air into the vehicle interior, the vehicle temperature control system comprising:
  a refrigerant circuit with a compressor, at least one condenser heat exchanger assembly around which air to be heated can flow and at least one evaporator heat exchanger assembly around which air to be cooled can flow, wherein:
  the at least one condenser heat exchanger assembly comprises:
  a first inflow area, a first flap assembly, the first inflow area being released and blocked by the first flap assembly, and a second inflow area, the second inflow area being released and blocked by the first flap assembly; and
  a first outflow area, a second flap assembly, the first outflow area being released and blocked by the second flap assembly, and a second outflow area, the second outflow area being released and blocked by the second flap assembly;
  the at least one evaporator heat exchanger assembly comprises:
  a third inflow area, a third flap assembly, the third inflow area being released and blocked by the third flap assembly, and a fourth inflow area, the fourth inflow area being released and blocked by the third flap assembly;
  a third outflow area, a fourth flap assembly, the third outflow area being released and blocked by the fourth flap assembly, and a fourth outflow area, the fourth outflow area being released and blocked by the fourth flap assembly; and
  the second outflow area and the fourth outflow area lead to an inner outflow area or the first outflow area and the third outflow area lead to an outer outflow area or both the second outflow area and the fourth outflow area lead to an inner outflow area and the first outflow area and the third outflow area lead to an outer outflow area.

12. A vehicle in accordance with claim 11, wherein the first inflow area and the third inflow area are arranged for receiving air from an external environment, and the second inflow area and the fourth inflow area are arranged for receiving air from the vehicle interior.

13. A vehicle in accordance with claim 11, further comprising at least one air distribution duct fed with air via at least one inner outflow area.

14. A vehicle in accordance with claim 11, further comprising a first air distribution duct fed with air via a first inner outflow area and a second air distribution duct fed with air via a second inner outflow area, wherein the first air distribution duct is separated or can be separated from the second air distribution duct.

15. A vehicle in accordance with claim 11, wherein:
  a first delivery device is associated with the inner outflow area for delivering air from the inner inflow area to a vehicle interior; or
  a second delivery device is associated with the outer outflow area for delivering air from the outer outflow area to an external environment; or
  a first delivery device is associated with the inner outflow area for delivering air from the inner inflow area to a vehicle interior and a second delivery device is associated with the outer outflow area for delivering air from the outer outflow area to an external environment.

16. A vehicle in accordance with claim 15, wherein:
  the first delivery device comprises at least one radial blower; or
  the second delivery device comprises at least one axial blower; or
  the first delivery device comprises at least one radial blower and the second delivery device comprises at least one axial blower.

17. A vehicle in accordance with claim 11, wherein the first inflow area and the third inflow area receive air from an external environment, and the second inflow area and the fourth inflow area receive air from a vehicle interior.

18. A vehicle temperature control system in accordance with claim 1, wherein the first flap assembly, the second flap assembly, the third flap assembly and the fourth flap assembly can be set in a cooling operation setting state, wherein in the cooling operation setting state:
  the first flap assembly releases the first inflow area and blocks the second inflow area;
  the second flap assembly releases the first outflow area and blocks the second outflow area;
  the third flap assembly blocks the third inflow area and releases the fourth inflow area; and
  the fourth flap assembly blocks the third outflow area and releases the fourth outflow area.

19. A vehicle temperature control system in accordance with claim 1, wherein wherein the first flap assembly, the second flap assembly, the third flap assembly and the fourth flap assembly can be set in a heating operation setting state, wherein in the heating operation setting state:
  the first flap assembly blocks the first inflow area and releases the second inflow area;
  the second flap assembly blocks the first outflow area and releases the second outflow area;
  the third flap assembly releases the third inflow area and blocks the fourth inflow area; and
  the fourth flap assembly releases the third outflow area and blocks the fourth outflow area.

20. A vehicle temperature control system in accordance with claim 1, wherein at least one flap assembly is configured as a double flap assembly, wherein:
  in a first setting state of the double flap assembly a first flap of the double flap assembly releases an inflow area or outflow area associated with the double flap assembly and a second flap of the double flap assembly blocks another inflow area or outflow area associated with the double flap assembly; and
  in a second setting state of the double flap assembly the first flap of the double flap assembly blocks the one inflow area or outflow area and the second flap of the double flap assembly releases the other inflow area or outflow area.

* * * * *